No. 864,428. PATENTED AUG. 27, 1907.
A. O. MITCHELL.
MILK REGENERATOR.
APPLICATION FILED OCT. 2, 1906.
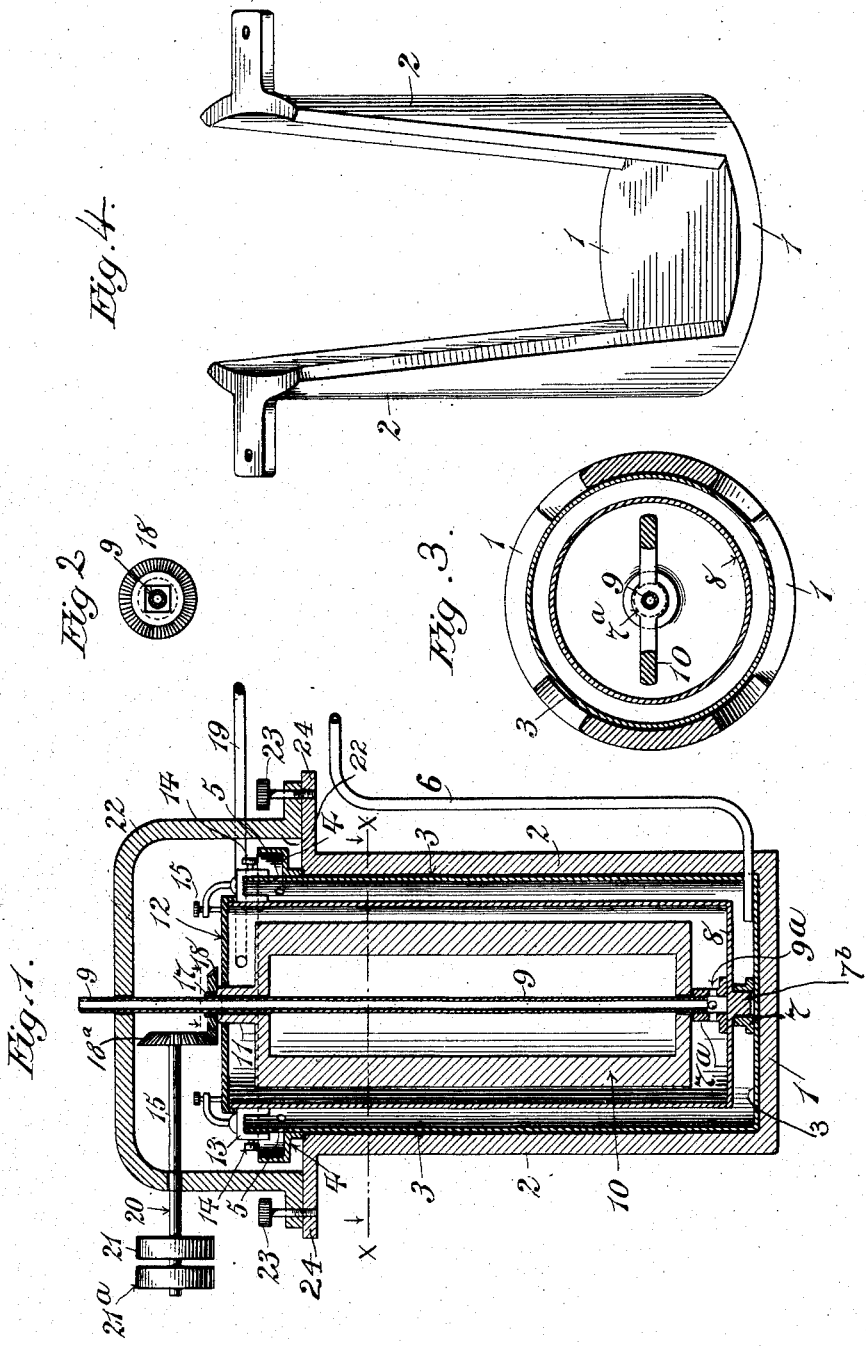

UNITED STATES PATENT OFFICE.

ALBERT O. MITCHELL, OF BETHLEHEM, CONNECTICUT.

MILK-REGENERATOR.

No. 864,428.   Specification of Letters Patent.   Patented Aug. 27, 1907.

Application filed October 2, 1906. Serial No. 337,106.

*To all whom it may concern:*

Be it known that I, ALBERT O. MITCHELL, a citizen of the United States of America, and a resident of Bethlehem, in the county of Litchfield and State of Connecticut, have invented certain new and useful Improvements in Milk-Regenerators, of which the following is a specification.

My invention relates to that class of regenerator in which the hot milk from the pasteurizer is cooled by the cool milk which is to be fed to the pasteurizer, and the said cool milk is warmed by the hot milk from the pasteurizer.

The invention is best understood by reference to the accompanying drawings.
Figure 1 is a vertical central section of the device, some of the parts not being in section, such as pipes, pulleys and wheel. Fig. 2 is a detail identified by reference numerals. Fig. 3 is a horizontal cross section at the line $x\,x$ looking downward. Fig. 4 is a view of the frame by itself.

The regenerator consists of a base 1 with lateral uprights 2, the three parts named constituting the holder for the remaining parts; an outer milk can 3, fastened tightly in the holder; an annular trough 4, surrounding the outer can near the upper portion and on the outside, feeding holes 5 in said can and communicating from the trough to said can, a pipe 6, extending from the lower interior portion of said can to the outside and carried up vertically, but not above the trough 4; a square socket 7, located at the bottom of the can 3, inside and centrally thereof; a second can 8, concentrically located within the first named can, a plug $7^b$ extending downward from the same and fitting into and removable from the socket 7; a threaded socket $7^a$, on the bottom and inside of the second can 8, and having holes $9^a$ through the same for communicating between the interior of the socket and the interior of the can 8; a pipe 9, having a threaded lower end screwed into the socket $7^a$ but not to cover the holes $9^a$, so that there is a free passage from the pipe 9 to the can 8; a dasher 10, fitting loosely on the pipe 9, and resting at its lower end on the top rim of the socket $7^a$ as a bearing and having a bearing 11, at its upper end for the pipe 9; a cover 12 on the can 8, with a central hole through which extends the bearing 11; brackets 13 riveted to the outside of the can 8, and having thumb screws 14, for being tightened against the can 3, for laterally supporting the can 8, and for holding pivoted thumb screw clamps at 15, which hold down the cover 12; a square end 17, for the bevel wheel 18 to fit removably upon; and a pipe 19, tangentially leaving the can 8 at the upper portion for carrying the pasteurized milk from the same.

A shaft 20 carries a second bevel wheel $18^a$ for driving the first one 18 and driven by a pulley 21, fixed upon the shaft 20, while the usual loose pulley $21^a$ is also on the shaft 20.

The pipe 9 passes loosely through the cross beam 22, which is held by thumb screws 23, to the lugs 24 on the uprights 2.

The operation is as follows:—Milk of the ordinary temperature is poured into the trough 4, after which it begins to run through the pipe 6, and then it is poured in about as fast as it runs out. Thereby, a thin layer of milk is formed around the outside of the can 8, as high as the level of the top of the pipe 6, and as thick as the distance between the inner surface of the outer can and the outer surface of the inner can 8. The hot milk enters the regenerator through the pipe 9, flows through the holes $9^a$, is caught by the rapidly rotating dasher 10, and raised to the pipe 19, through which it passes, much cooler than when it entered. Likewise, the milk in the pipe 6, is much hotter than when it entered the trough 4. I have not shown well known washers and packing which may be added to suit the judgment of the builders of the machine.

I will now describe the operation of taking the regenerator apart for the purpose of washing and sterilizing. Loosen the thumb screws 23, lift off the cross beam 22, take off the wheel 18, loosen the thumb screws 15, and turn back the clamp to which they are attached, raise and remove the cover 12, take out the dasher 10, unscrew the pipe 9 from the socket $7^a$, take out the can 8, after loosening the thumb screws 14. The device may be assembled in about the reverse order. Although the description is lengthy, the operator has occasion to take the regenerator apart and to put it together so many times that about one minute will be the time of each operation. The pipe 6 is removable, so that the can 3 may be raised clear of the base 1.

I claim as my invention;—

1. A milk regenerator, consisting of the combination of an outer and inner can, concentrically located, a rotary dasher in the inner can, means for feeding cool milk between the two cans and for its exit, a socket and plug for preventing the inner can from rotation, a second socket on the bottom of the inner can and having holes, a threaded pipe screwed into said second socket, and forming a shaft for the rotation of the dasher which is loose thereon, a square end on the dasher, a bevel wheel on the square end and loose thereon, means for turning said wheel, a cover for the inner can, brackets fastened to said inner can, screw clamps pivoted to said brackets for holding down the cover firmly, and an outlet pipe for the inner can, the passage for the hot milk being from the pipe which is screwed into the second socket, through the holes in said second socket, and then up the walls of the inner can, and out of the pipe for the inner can.

2. A milk regenerator, consisting of the combination of a base, uprights thereon, a can therein, an annular trough around the can, a second can in the first but smaller and concentrically located to leave a milk space around and below the second can, means for feeding and delivering cool milk to and from this space, means for feeding and delivering hot milk to and from the second can, means for elevating the hot milk up and around the inner surface of the inner can, a device for preventing the inner can from rotation, a cover for the inner can, means for fastening the same rigidly on the inner can, lugs on the uprights, a cross beam, a driving shaft carried by said beam, and thumb screws for holding said beam to said lugs.

3. In a regenerator, a central stationary pipe, a can, threads on the pipe, a screw socket, into which said threads are screwed to hold the pipe to said socket, which has holes through it just below the end of said pipe, and a pipe passing out of the upper end of said can tangentially, for the exit of the cooled hot milk, a rotating dasher being provided for raising the milk over the surface of the can, to the outlet pipe.

In testimony whereof, I have hereunto affixed my signature in the presence of two subscribing witnesses.

ALBERT O. MITCHELL. [L. S.]

Witnesses:
RAYMOND THOMSON,
ANNIE E. MITCHELL.